United States Patent [19]

Gokhman

[11] Patent Number: 4,496,282

[45] Date of Patent: Jan. 29, 1985

[54] REVERSIBLE TWO-STAGE HYDRAULIC MACHINE

[75] Inventor: Alexander Gokhman, York, Pa.

[73] Assignee: Allis-Chalmers Corporation, Milwaukee, Wis.

[21] Appl. No.: 375,701

[22] Filed: May 6, 1982

[51] Int. Cl.³ .............................................. F01D 13/02
[52] U.S. Cl. ................................ 415/161; 415/198.1; 415/500; 415/152 R
[58] Field of Search .............. 415/198.1, 150, 152 R, 415/152 A, 153 R, 161, 500, 143; 417/407

[56] References Cited

U.S. PATENT DOCUMENTS

| | | | |
|---|---|---|---|
| 2,010,555 | 8/1935 | Moody | 415/152 R UX |
| 3,435,771 | 4/1969 | Riple | 415/143 X |
| 3,867,059 | 2/1975 | Fauconnet | 415/500 X |
| 4,082,477 | 4/1978 | Kronogard | 415/143 X |
| 4,280,788 | 7/1981 | Tsunoda | |

FOREIGN PATENT DOCUMENTS 1503232  10/1970  Fed. Rep. of Germany ...... 415/143
1373803  8/1964  France ............................. 415/198.1
537778  1/1956  Italy ................................ 415/198.1

*Primary Examiner*—Robert E. Garrett
*Assistant Examiner*—Joseph M. Pitko
*Attorney, Agent, or Firm*—Timothy R. Conrad

[57] ABSTRACT

A reversible two-stage hydraulic machine, or pump/turbine, is disclosed having a rotary shaft. A first-stage Francis-type runner is fixed to the shaft with a spiral casing surrounding the first stage runner for distributing water to the runner from an upper reservoir. Stay vanes and wicket gates in the first-stage casing direct water to flow toward the first-stage runner in a spiral path having a direction in common with the rotational direction of the shaft. Water discharging axially from the first-stage runner is admitted to axial openings of a second-stage Fourneiron-type runner. Water is discharged from the second-stage runner in a radial plane. Second-stage stay vanes surrounding the discharge of the second-stage runner direct the water to flow in a spiral path having a rotational direction opposite of that of the shaft.

11 Claims, 4 Drawing Figures

REVERSIBLE TWO-STAGE HYDRAULIC MACHINE

BACKGROUND OF THE INVENTION

1. Field of the Invention

This invention relates to multistage hydraulic machines operable as pumps or turbines. More specifically, this invention relates to a reversible two-stage pump/turbine for a hydraulic installation having an operating head generally in excess of 1,000 meters.

2. Description of the Prior Art

In the art, hydraulic pumped storage facilities are well known for storing energy during periods of low electrical demand by pumping water from a low elevation reservoir to a high elevation reservoir. During periods of peak electrical demand, the stored energy is released by passing the water from the upper reservoir through a hydraulic turbine to the lower reservoir. The turbine converts the stored energy, or potential energy, into electrical energy by driving a generator. The potential energy is proportional to the difference in elevation between the upper and lower reservoirs (commonly referred to as the operating head).

Historically, pumped storage facilities employed separate pumps and hydraulic turbines of conventional design. With the development of reversible pump/turbines, a single machine could perform both the pumping and generating operations. Originally, reversible pump/turbines were provided with a single stage. That is, a single runner, commonly a Francis-type runner, was mounted on a rotary shaft with the shaft engaging a motor/generator. In pumping operation, the shaft is driven by the motor with the runner creating a pressure head for pumping water to the higher reservoir. In the turbine mode, water flowing through the runner to the lower reservoir would cause the shaft to rotate and the associated generator would produce the desired electrical power.

Single-stage pump/turbines are designed such that, when operated in the turbine mode, water approaching the runner from the upper reservoir will be provided with a whirl. The whirl is formed by a spiral case and fixed vanes which are typically provided around the runner's circumference. Due to the whirl, the water has a circumferential velocity component in the shaft rotation and approaches the runner in spiral paths. The whirl is removed by the runner causing the desired rotation of the shaft.

At high efficiency, the water leaves the runner of a single-stage pump/turbine with little appreciable whirl. The change in whirl is related to the operating head and angular velocity of the shaft by the following equation, generally referred to as Euler's equation:

$$V_{u1}R_1 - V_{u2}R_2 = g(He/W)$$

where $V_{u1}R_1$ and $V_{u2}R_2$ are the values of whirl of the water approaching and leaving the runner, respectively. $V_{u1}$ and $V_{u2}$ represent the circumferential components of water velocity approaching and leaving the runner, respectively, with $R_1$ and $R_2$ representing the radii (measured perpendicularly from the shaft's axis of rotation) of the runner's entrance and exit. The values g, H, e and W respectively refer to the acceleration of gravity, the operating head, the hydraulic efficiency, and the angular velocity of the turbine shaft. For modern single-stage turbine installations, hydraulic efficiency (e) is generally in excess of 90% with the value of whirl exiting the runner being small in comparison with the value of whirl approaching the runner.

As can be seen from Euler's equation, the value of whirl approaching the runner ($V_{u1}R_1$) is almost directly proportional to the operating head (H) when the value of $V_{u2}R_2$ is very small. Accordingly, for very high head installations (for example, installations having operating heads in excess of 1,000 meters), the value of whirl approaching the runner ($V_{u1}R_1$) becomes so large that the relative velocity of the water (expressed $W_{u1} = -V_{u1} - WR_1$) becomes positive and is directed toward the shaft rotation. The relative velocity at the outlet of the runner ($W_{u1} = V_{u2} - WR_2$) is always negative since the value of $V_{u2}R_2$ is very small. This relationship between the values $W_{u1}$ and $W_{u2}$ results in an extremely curved shape of the runner blade which leads to lower values of efficiency.

To overcome the problems associated with positive relative velocity, multistage pump/turbines were developed for high head installations. A conventional two-stage pump/turbine is provided with two Francis-type runners arranged in series on a common shaft. An example of such a two-stage pump/turbine is shown in U.S. Pat. No. 4,280,788 to Tsunoda et al dated July 28, 1981. As shown in Tsunoda, when the machine is operated in the turbine mode, water is delivered to the radial openings of a first-stage, or high pressure, Francis-type runner and discharged from the runner in an axial direction. A return passage directs the water discharged from the first-stage runner to radial openings of a second-stage, or low pressure, Francis-type runner. Discharge from the second-stage runner is also in the axial direction.

Under the arrangement as shown in Tsunoda, the potential energy represented by the operating head is divided between the two runners by design of stay vanes and control of wicket gates in the first stage to reduce the value of whirl of the water delivered to the first-stage runner. The whirl is so reduced such that the relative velocity of the water is maintained at a negative value. As the water passes through the first-stage runner, the whirl is taken out of the water by the runner for driving the turbine shaft. The water discharges from the first-stage runner with a small value of whirl and is directed through the return passage to the second-stage runner. Stay vanes or wicket gates surrounding the second-stage runner impart to the water a value of whirl as it approaches the second-stage runner. The second-stage runner removes this whirl and discharges the water with little appreciable whirl. In both the first and second stages, the water is directed toward the runners in spiral paths having rotational directions in common with the rotational direction of the shaft. For convenience, a whirl in a direction in common with the shaft rotation may be referred to as a positive whirl while a whirl in a direction opposite to the shaft rotation may be referred to as a negative whirl. The arithmetic sum of the whirls removed by the first and second-stage runners is proportional to the operating head.

While conventional two-stage pump/turbines, as described, are effective for avoiding problems of positive relative water velocity while efficiently converting potential energy into kinetic energy by dividing the potential energy between two runners, certain problems are associated with such pump/turbines. First, the need for a return passage requires the first and second-stage runners to be materially spaced apart on the shaft which increases the length of the shaft resulting in increased weight and costs. Second, while such pump/turbine are regulatable in the turbine mode (by adjustable wicket gates), they are not regulatable in the pump mode. Third, either the shaft is long and directed by a bearing embedded in a draft tube (as shown in Tsunoda) or the shaft terminates with the second-stage runner with no guide bearing in the second stage. In either case, the pump/turbine is subject to critical speed limitations.

SUMMARY OF THE INVENTION

An object of the present invention is to provide a two-stage pump/turbine which eliminates a need for a lengthy return passage between the first and second stages.

A further object of the present invention is to provide a two-stage pump/turbine which is regulatable in both the turbine and pump modes of operation.

A still further object of the present invention is to provide a two-stage pump/turbine having a short shaft with a directional bearing in the second stage.

According to a preferred embodiment of the present invention, a reversible two-stage hydraulic machine, or pump/turbine having a rotary shaft operable to rotate about a vertical axis of rotation in both a clockwise and counterclockwise direction when viewed from above the machine. The pump/turbine has a first stage comprising a Francis-type runner fixed to the shaft. A first-stage spiral casing surrounds radial openings of the first-stage runner and is connected in fluid flow communication with an upper reservoir. Fixed first-stage stay vanes surrounding radial openings of the first-stage runner operate to direct water to approach and depart the runner in a spiral path about the shaft with a rotational direction in common with the shaft's rotational direction. First-stage wicket gates, pivotally mounted between the first-stage stay vanes and the first-stage runner, are provided for selectively adjusting the angle of water flow between the stay vanes and the runner.

The pump/turbine is provided with a second stage having a second-stage Fourneiron-type runner fixed to the shaft below the first-stage runner. Axial openings of the first-stage runner face axial openings of the second-stage runner to provide a continuous fluid passage between the runners. The second-stage runner has radial openings surrounded by a second stage spiral casing connected in fluid flow communication with a lower reservoir by a draft tube. Fixed second-stage stay vanes surrounding the radial openings of the second-stage runner operate to direct water approaching and departing the radial openings in a spiral path having a rotational direction opposite the direction of rotation of the shaft.

When the machine is operated as a turbine, water flows past the first-stage stay vanes toward the first-stage runner. The spiral case and stay vanes impart to the water a positive value of whirl with the pivotal wicket gates operable to selectively vary this value. The whirl is removed by the first-stage runner with the associated energy converted to kinetic energy represented by the rotation of the shaft. The water is discharged from the first-stage runner with a value of positive whirl less than $g(eH_2/W)$ (where $H_2$ is the head of the second stage).

The water discharged from the first-stage runner is directly admitted to the axial openings of the second-stage runner. As a result of the shape of the second-stage runner blades, the water leaves the second stage with a negative value of whirl. Accordingly, the potential energy represented by the operating head is divided between the first and second stages with the first stage removing the positive whirl created by the first-stage spiral case and stay vanes and the second-stage imparting a negative whirl to water departing the second stage. The net effect of the arrangement is the total kinetic energy delivered to the shaft is directly related to the arithmetic sums of the absolute values of the positive whirl removed by the first stage and the negative whirl imparted by the second stage. Since the water leaves the second-stage runner with a high value of whirl, it is necessary to have a spiral case leading the water from the runner outlet to the inlet of the draft tube.

It should be noted the high value of whirl present in the water leaving the turbine results in a cavitation factor significantly higher than that associated with conventional two-stage pump/turbines. However, for applications in an underground pumped storage plant where the second stage may be positioned at an elevation beneath the elevation of the lower reservoir, the higher cavitation factor is acceptable. For example, I have determined for a 600,000 kW pump/turbine operating under a head of 1500 meters, cavitation problems can be avoided by positioning the second stage under the elevation of the lower reservoir by 57 meters.

In the pump mode of operation, the shaft rotates in a counterclockwise direction and water moves from the lower reservoir to the second-stage casing. Second-stage stay vanes causes the water to whirl in a clockwise direction as approaching the radial openings of the second-stage runner. The water flows from the axial openings of the second-stage runner to the axial openings of the first-stage runner. The water leaves the first-stage runner through the radial openings with a whirl in a counterclockwise direction.

In an alternate embodiment of the present invention, pivotally mounted second-stage wicket gates are provided between the second-stage stay vanes and the radial openings of the second-stage runner. The second-stage wicket gates permit the angle of flow between the second-stage vanes and the second-stage runner to be selectively adjusted permitting regulation of the machine in the pump mode.

BRIEF DESCRIPTION OF THE DRAWINGS

Various other objects, features and advantages of the present invention will be more fully appreciated as the same becomes better understood from the following detailed description when considered in connection with the accompanying drawings in which:

Referring to FIG. 1, a reversible two-stage hydraulic machine (or pump/turbine) is shown having a shaft 10 mounted for rotation about a vertical axis of rotation X—X. Shaft 10 engages a motor/generator (not shown). The machine is provided with a first stage 11 comprising a first-stage runner 12 secured to shaft 10 for rotation therewith. A first-stage bearing 51 is provided for directing shaft 10. Runner 12 is a Francis-type runner having a hub 13 secured to shaft 10 and extending radially therefrom. A plurality of first-stage runner blades 14 are affixed circumferentially about hub 13. An annular first-stage shroud 15 is affixed to blades 14 on end faces thereof remote from hub 13. Blades 14, hub 13 and shroud 15 cooperate to define a plurality of fluid passages 16 through runner 12 with passages 16 having radial openings 17 circumferentially disposed about shaft 10 in a plane perpendicular to shaft 10. Passage 16 further has axial openings 18 circumferentially disposed about shaft 10 beneath the plane of radial openings with each axial opening 18 opening generally parallel to shaft 10.

The first-stage runner 12 is surrounded by a first-stage spiral case 19 formed by a first-stage upper ring 20 and first-stage lower ring 21 to define a first-stage spiral fluid passage 22 rotating about shaft 10 in a clockwise direction when viewed from above the first-stage spiral case and as is more fully shown in FIG. 2. A penstock 29 connects spiral passage 22 in fluid flow communication with an upper reservoir (not shown). Between the spiral passage 22 and the radial openings 17 there is provided a first-stage stay ring 23 comprising a plurality of first-stage stay vanes 24 circumferentially disposed about shaft 10. Vanes 24 are fixed to upper ring 20 and lower ring 21 and cooperate therewith to define a plurality of arcuate passages 25 between spiral passage 22 and radial openings 17 of runner 12. As shown in FIG. 2, arcuate passages 25 are in a clockwise direction from spiral passage 22 toward radial openings 17. A plurality of first-stage wicket gates 26 are pivotally mounted between stay ring 23 and runner 12 with wicket gates 26 circumferentially surrounding runner 12. Suitable means well known in the art, such as gate rods 27 and a gate operating ring 28 are provided for selectively adjusting the pivotal position of gates 26 and thereby adjusting the angle of gates 26.

Figure 1:
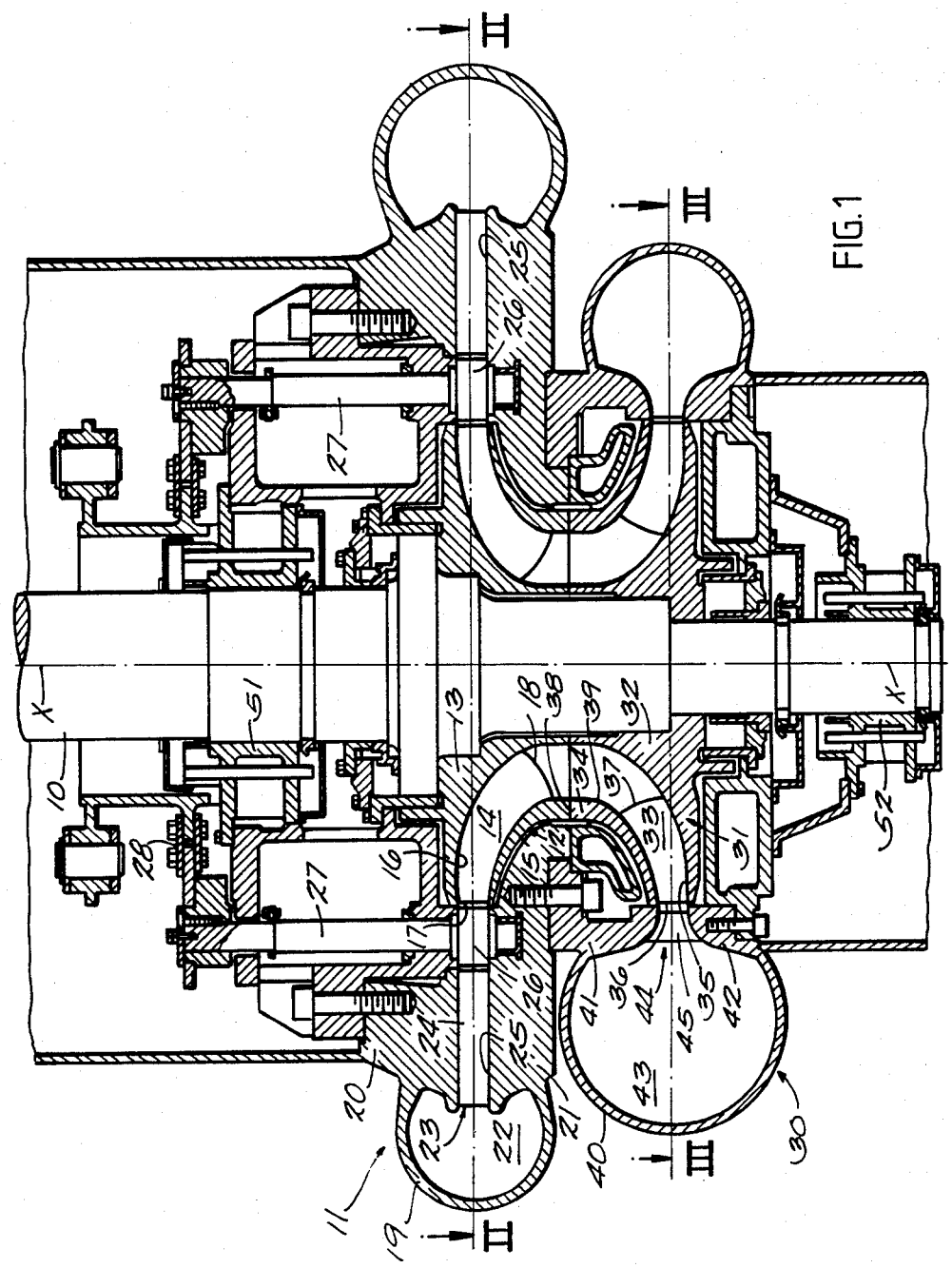
FIG. 1 is a structural drawing showing an embodiment of the two-stage hydraulic machine according to this invention.
Figure 2:
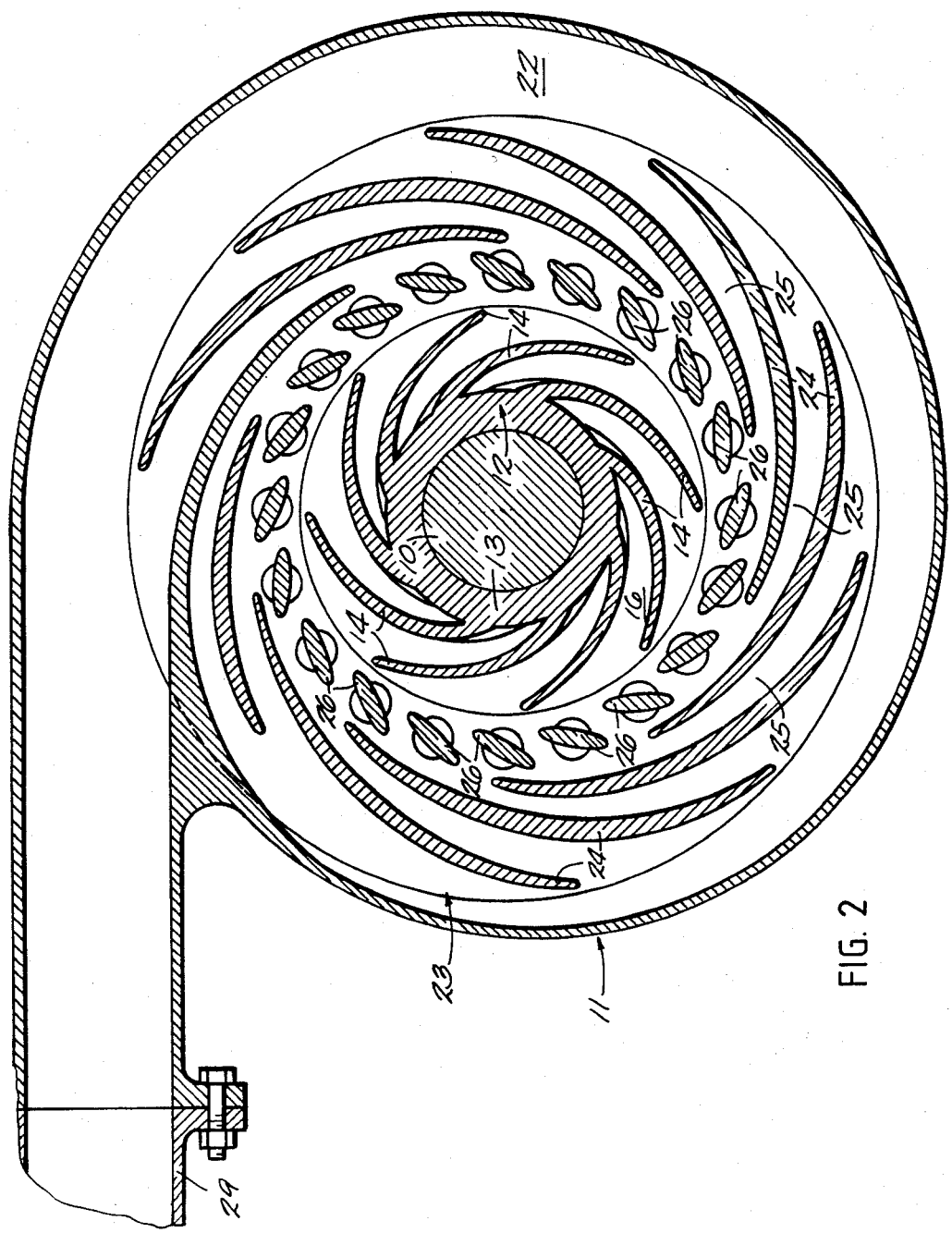
FIG. 2 is a view of a first-stage of the machine taken along line II—II of FIG. 1.

The machine is further provided with a second stage 30 having a second-stage runner 31 secured to shaft 10 for rotation therewith beneath the first-stage runner 12. Second-stage runner 31 is a Fourneiron-type runner having a hub 32 secured to shaft 10 and extending radially therefrom. A plurality of second-stage runner blades 33 are fixed circumferentially about hub 32 on a side thereof facing first stage runner 12. An annular second-stage shroud 34 is affixed to blades 33 on end faces thereof remote from hub 32. Blades 33, hub 32 and shroud 34 cooperate to define a plurality of fluid passages 35 through runner 31 with passages 35 having radial openings 36 circumferentially disposed about shaft 10 in a plane perpendicular to shaft 10. Passages 35 further have axial openings 37 circumferentially disposed about shaft 10 above the plane of radial openings 36 and facing the axial openings 18 of the first-stage runner 12. First-stage shroud 15 abuts second-stage shroud 34 such as at 38 to form a continuous and smooth fluid passage 39 from axial openings 18 of first-stage runner 12 to the axial openings 37 of the second-stage runner 31.

Figure 3:
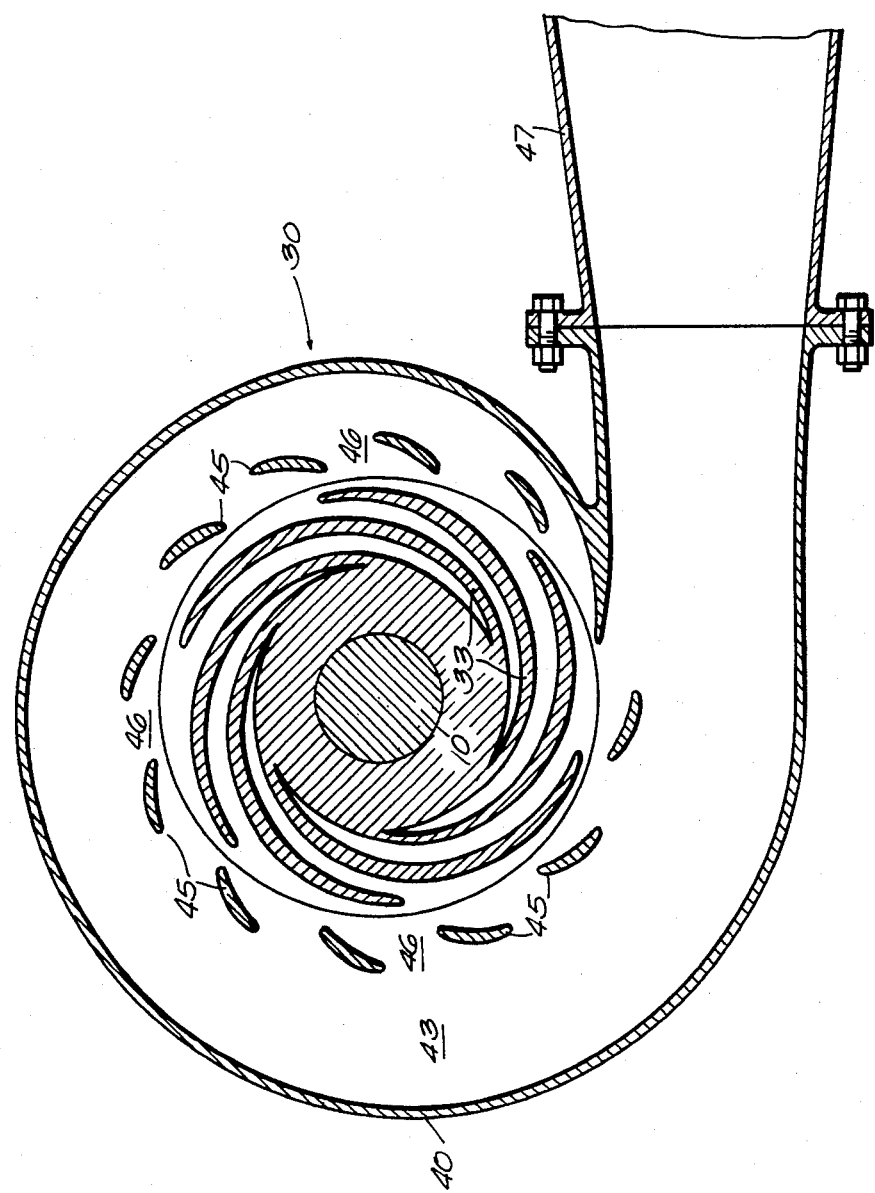
FIG. 3 is a view of a second-stage of the machine taken along line III—III of FIG. 1.

The second-stage runner 31 is surrounded by a second-stage spiral case 40, formed by a second-stage upper ring 41 and second-stage lower ring 42 to define a second-stage spiral fluid passage 43. As shown in FIG. 3, second-stage spiral passage 43, when viewed from above second-stage spiral case 40, rotates about shaft 10 in a counterclockwise direction. Circumferentially spaced between spiral passage 43 and the radial openings 36 of the second-stage runner 31 there is provided a second-stage stay ring 44 comprising a plurality of arcuate second-stage stay vanes 45 circumferentially disposed about shaft 10. Vanes 45 are fixed to upper ring 41 and lower ring 42 and cooperate therewith to define a plurality of arcuate passages 46 between second-stage spiral passage 43 and radial openings 36 of second-stage runner 31. As shown in FIG. 3, arcuate passages 46 arc in a counterclockwise direction from spiral passage 43 toward radial openings 36. A draft tube 47 connects spiral passages 43 with a lower reservoir (not shown) at an elevation less than the elevation of the upper reservoir. A second-stage bearing 52 is provided beneath second-stage runner 31 for directing shaft 10.

Figure 4:
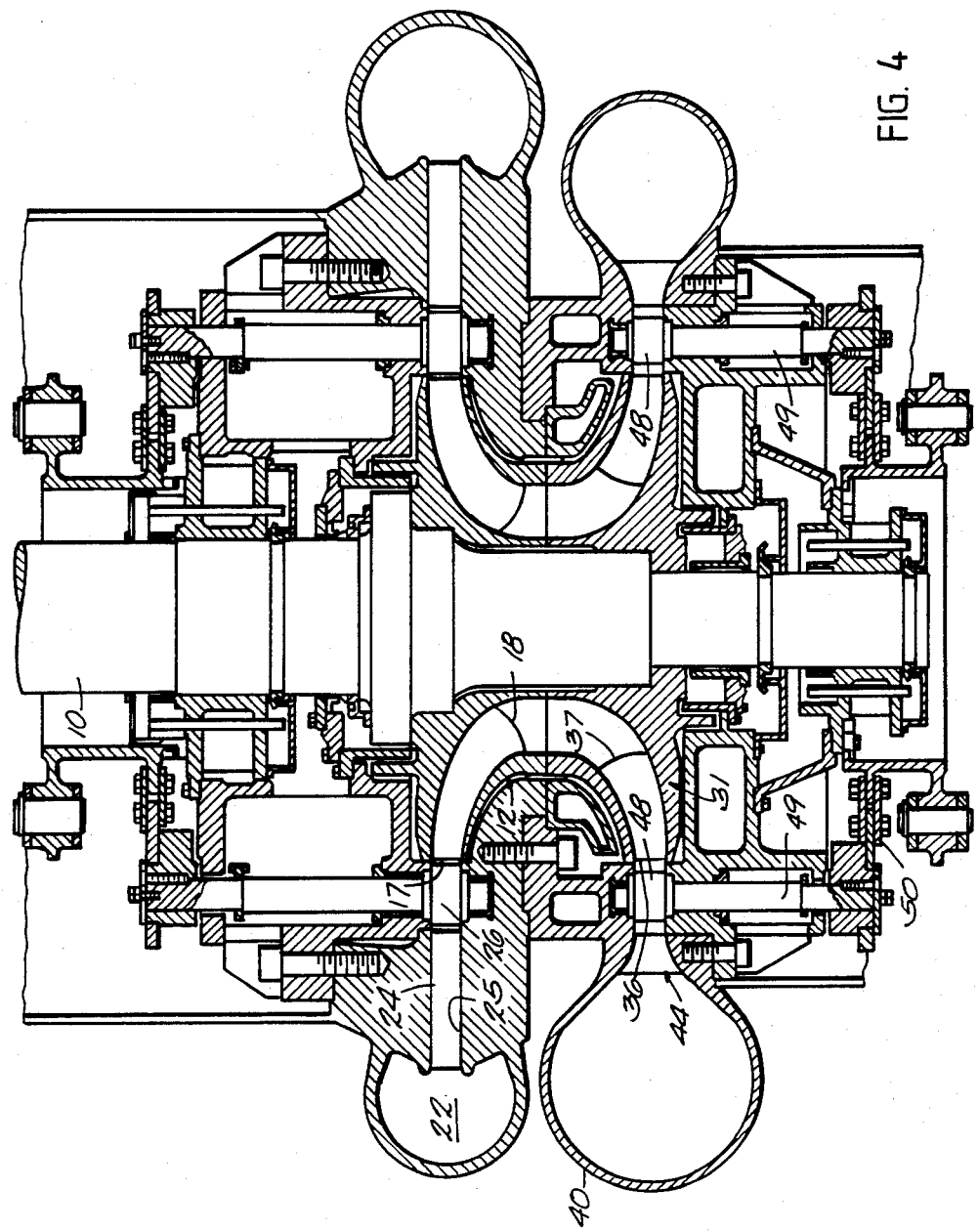
FIG. 4 is a structural drawing showing an alternate embodiment of the invention.

FIG. 4 shows an alternate embodiment of the invention having a plurality of second-stage wicket gates 48 pivotally mounted between second-stage stay ring 44 and the second-stage runner 31 circumferentially surrounding runner 31. Gate rods 49 and a second-stage gate operating ring 50 are provided for selectively adjusting the pivotal position of gate 48 and thereby adjusting the angle of each gate.

When the machine is to be operated as a turbine, water flows from the upper reservoir through the penstock 29 and into the first-stage spiral fluid passage 22. The water passes from the spiral passage 22 toward the first-stage runner 12 through the arcuate passages 25 in the first-stage stay vanes 24. As the water approaches the radial openings 17 of the first-stage runner 12, the stay vanes 24 forming arcuate passages 25 impart to the flowing water a whirl in a clockwise direction. For ease of description, a whirl in a clockwise direction will be referred to as a positive whirl and a whirl in a counterclockwise direction will be referred to as a negative whirl. The value of the positive whirl of the water entering the radial openings 17 of the first-stage runner 12 may be selectively adjusted by adjusting the pivotal positioning of wicket gates 26. The positive whirl is removed from the water by runner 12 which is caused to rotate in a positive, or clockwise directon, with the water leaving runner 12 through axial openings 18 having only a small positive value of whirl.

The water discharged from the axial openings 18 of first-stage runner 12 is admitted to the second-stage runner 31 through its axial openings 37. Passing through second-stage runner 31 and exiting runner 31, through its radial openings 36, the water is imparted with a negative value of whirl in the second-stage spiral casing 40. The water discharged from the second stage is transmitted to the lower reservoir through draft tube 47. The arithmetic sum of the absolute values of the positive whirl removed by the first stage and the negative whirl imparted by the second stage is directly related to the kinetic energy represented by the rotation of shaft 10 and represents the energy of the water available for conversion (as represented by the operating head less an allowance for hydraulic efficiency) in accordance with Euler's equation.

In the pump mode, the shaft 10 rotates in a counterclockwise direction with water approaching the radial openings 36 of the second-stage runner 31 having a whirl in a clockwise direction. The water leaves the machine from the first stage having a value of whirl in a counterclockwise direction. In operation of the machine according to the alternate embodiment shown in FIG. 4, the pumping operation may be regulated by selectively adjusting the pivotal positioning of the second-stage wicket gate 48.

As can be seen from the foregoing, the potential energy of the elevated water as represented by the operating head may be divided between the first and second stages of the pump/turbine thereby avoiding the undesirable effect of positive relative velocity associated with single-stage pump/turbines. Furthermore, the arrangement of the first-stage Francis-type runner 12 and second-stage Fourneiron-type runner 31 permit the conversion of the energy of the water to shaft rotation without the need for a return passage connecting the first and second stages.

Modifications and equivalents of the disclosed concepts such as readily occur to those skilled in the art are intended to be included in the scope of this invention. Thus, the scope of the invention is intended to be limited only by the scope of the claims such as or may hereafter be, appended hereto.

The embodiments of the invention in which an exclusive property or privilege is claimed are defined as follows:

1. A reversible two-stage hydraulic machine having a rotary shaft operable to rotate about an axis of rotation in both a clockwise and counterclockwise direction, the improvements comprising:
    a first-stage hydraulic machine runner affixed to said shaft for rotation therewith; said runner having a plurality of runner blades cooperating to define a plurality of fluid passages through said runner; each of said passages having a radial opening which opens along a plane perpendicular to said shaft and an axial opening parallel to said shaft;
    a second-stage hydraulic machine runner affixed to said shaft for rotation therewith; said runner having a plurality of runner blades cooperating to define a plurality of fluid passages through said runner; each of said passages having a radial opening which opens along a plane perpendicular to said shaft and an axial opening parallel to said shaft; said axial openings of said second-stage runner facing said axial openings of said first-stage runner in fluid flow communication;
    means for connecting said radial openings of said first-stage runner in fluid flow communication with an upper water reservoir; and,
    means for connecting said radial openings of said second-stage runner in fluid flow communication with a lower water reservoir at an elevation below said upper reservoir.

2. A reversible two-stage hydraulic machine having a rotary shaft operable to rotate about an axis of rotation in both a clockwise and counterclockwise direction comprising:
    a first-stage runner affixed to said shaft for rotation therewith; said runner having a plurality of runner blades cooperating to define a plurality of fluid passages through said runner; each of said passages having a radial opening which opens along a plane perpendicular to said shaft and an axial opening parallel to said shaft;
    a second-stage runner affixed to said shaft for rotation therewith; said runner having a plurality of runner blades cooperating to define a plurality of fluid passages through said runner; each of said passages having a radial opening which opens along a plane perpendicular to said shaft and an axial opening parallel to said shaft; said axial openings of said second-stage runner facing said axial openings of said first-stage runner in fluid flow communication;
    means for connecting said radial openings of said first-stage runner in fluid flow communication with an upper reservoir;
    means for connecting said radial openings of said second-stage runner in fluid flow communication with a lower reservoir at an elevation below said upper reservoir;
    first means for directing fluid to approach and depart said radial openings of said first-stage runner in a spiral path about said shaft with a rotational direction in common with the rotational direction of said shaft; and,
    second means for directing fluid to approach and depart said radial openings of said second-stage runner in a spiral path about said shaft with a rotational direction opposite the rotational direction of said shaft.

3. A reversible two-stage hydraulic machine according to claim 2:
    wherein said first means comprises a first-stage spiral casing surrounding said first-stage runner; a first-stage stay ring within said casing and surrounding said runner, said stay ring comprising a plurality of first-stage stay vanes operable to direct fluid to approach and depart said radial openings of said first-stage runner in a spiral path rotating about said shaft with a rotational direction in common with the rotational direction of said shaft; and,
    wherein said second means comprises a second-stage spiral casing surrounding said second-stage runner; a second-stage stay ring within said casing and surrounding said runner; said stay ring comprising a plurality of second-stage stay vanes operable to direct fluid to approach and depart said radial openings of said second-stage runner in a spiral path rotating about said shaft with a rotational direction opposite the rotational direction of said shaft.

4. A reversible two-stage hydraulic machine according to claim 3 comprising a penstock connecting said first-stage spiral casing with said upper reservoir in fluid flow communication and a draft tube connecting said second-stage spiral casing with said lower reservoir.

5. A reversible two-stage hydraulic machine according to claim 4 including means for selectively adjusting the angle of flow between said first-stage stay ring and said radial openings of said first-stage runner.

6. A reversible two-stage hydraulic machine according to claim 5 including means for selectively adjusting the angle of flow between said second-stage stay ring and said radial openings of said second-stage runner.

7. A reversible two-stage hydraulic machine according to claim 5 wherein said means comprises a plurality of wicket gates pivotally mounted between said first-stage stay vanes and said radial openings of said first-stage runner.

8. A reversible two-stage hydraulic machine according to claim 6 wherein said means comprises a plurality of wicket gates pivotally mounted between said second-stage stay vanes and said radial openings of said second-stage runner.

9. A reversible two-stage hydraulic machine according to claims 7 or 8 wherein said rotary shaft is rotatable about a vertical axis of rotation.

10. A reversible two-stage hydraulic machine having a rotary shaft operable to rotate about a vertical axis of rotation in both a clockwise and counterclockwise direction, the improvements comprising:

a first-stage Francis-type runner affixed to said shaft for rotation therewith; a first-stage spiral casing surrounding said runner; a first-stage stay ring within said casing and surrounding said runner; said stay ring comprising a plurality of first-stage stay vanes operable to direct fluid to approach and depart said runner in a spiral path about said shaft with a rotational direction in common with the rotational direction of said shaft; a plurality of wicket gates pivotally mounted between said stay vanes and said runner; a penstock connecting said sprial case with an upper reservoir in fluid flow communication;

a second-stage Fourneiron-type runner affixed to said shaft for rotation therewith beneath said first-stage runner and in fluid flow communication therewith;

a second-stage spiral casing surrounding said runner; a second-stage stay ring within said casing and surrounding said runner; said stay ring comprising a plurality of first-stage stay vanes operable to direct fluid to approach and depart said runner in a spiral path about said shaft with a rotational direction opposite the rotational direction of said shaft;

a penstock connecting said first-stage spiral casing with an upper reservoir in fluid flow communication; and, a draft tube connecting said second-stage spiral casing with a lower reservoir in fluid flow communication.

11. A reversible two-stage hydraulic machine according to claim 10 comprising a plurality of wicket gates pivotally mounted between said second-stage stay vanes and said second-stage runner.

* * * * *